United States Patent
Hansen et al.

(10) Patent No.: US 6,918,623 B2
(45) Date of Patent: Jul. 19, 2005

(54) PROTECTIVE DEVICE FOR A MOTOR VEHICLE

(75) Inventors: Melf Hansen, Gondelsheim (DE); Herbert Walter, Ebersbach (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/629,166

(22) Filed: Jul. 29, 2003

(65) Prior Publication Data

US 2004/0021332 A1 Feb. 5, 2004

(30) Foreign Application Priority Data

Jul. 31, 2002 (DE) .......................... 102 35 870

(51) Int. Cl.$^7$ .............................................. B62D 33/04
(52) U.S. Cl. ..................... 296/24.3; 296/24.43; 296/98; 296/37.16; 160/310
(58) Field of Search ................................ 296/136.1, 98, 296/24.1, 37.1, 37.8, 37.16; 160/370.22, 310, 265; 276/24.3, 24.4, 24.43, 24.44

(56) References Cited

U.S. PATENT DOCUMENTS

| | | | | |
|---|---|---|---|---|
| 3,061,006 A | * | 10/1962 | Hazlett | 160/265 |
| 5,033,527 A | * | 7/1991 | Ouvrard et al. | 160/310 |
| 5,201,810 A | * | 4/1993 | Ojima et al. | 160/265 |
| 5,372,173 A | * | 12/1994 | Horner | 160/98 |
| 5,538,306 A | | 7/1996 | Ament | |
| 6,003,920 A | * | 12/1999 | Crisp | 296/37.1 |
| 6,095,231 A | * | 8/2000 | Hahn | 160/370.22 |
| 6,345,854 B1 | * | 2/2002 | McManus | 296/26.13 |
| 6,536,829 B2 | * | 3/2003 | Schlecht et al. | 296/97.4 |
| 6,568,732 B2 | * | 5/2003 | De Gaillard | 296/24.1 |
| 6,598,648 B1 | * | 7/2003 | Schulte | 160/1 |
| 6,846,032 B2 | * | 1/2005 | de Gaillard et al. | 296/98 |
| 6,848,493 B1 | * | 2/2005 | Hansen et al. | 160/370.22 |
| 2002/0113450 A1 | | 8/2002 | DeGaillard | |
| 2004/0232720 A1 | * | 11/2004 | Schlecht | 296/37.16 |
| 2004/0245793 A1 | * | 12/2004 | Fischer | 296/24.4 |

FOREIGN PATENT DOCUMENTS

| | | |
|---|---|---|
| DE | 40 16 707 | 11/1991 |
| DE | 201 04 832 | 8/2002 |

* cited by examiner

*Primary Examiner*—H. Gutman
(74) *Attorney, Agent, or Firm*—Flynn, Thiel, Boutell & Tanis, P.C.

(57) ABSTRACT

A protective device for a motor vehicle comprising a flat sheet which is movably supported between a compactly rolled-up rest position and a pulled-out deployed position, which flat sheet is supported over its pull-out path in guideways in the sides of the vehicle. A drive system is associated with the flat sheet on each side thereof. The two drive systems are connected to one another through a mechanical synchronization gearing assembly.

16 Claims, 1 Drawing Sheet

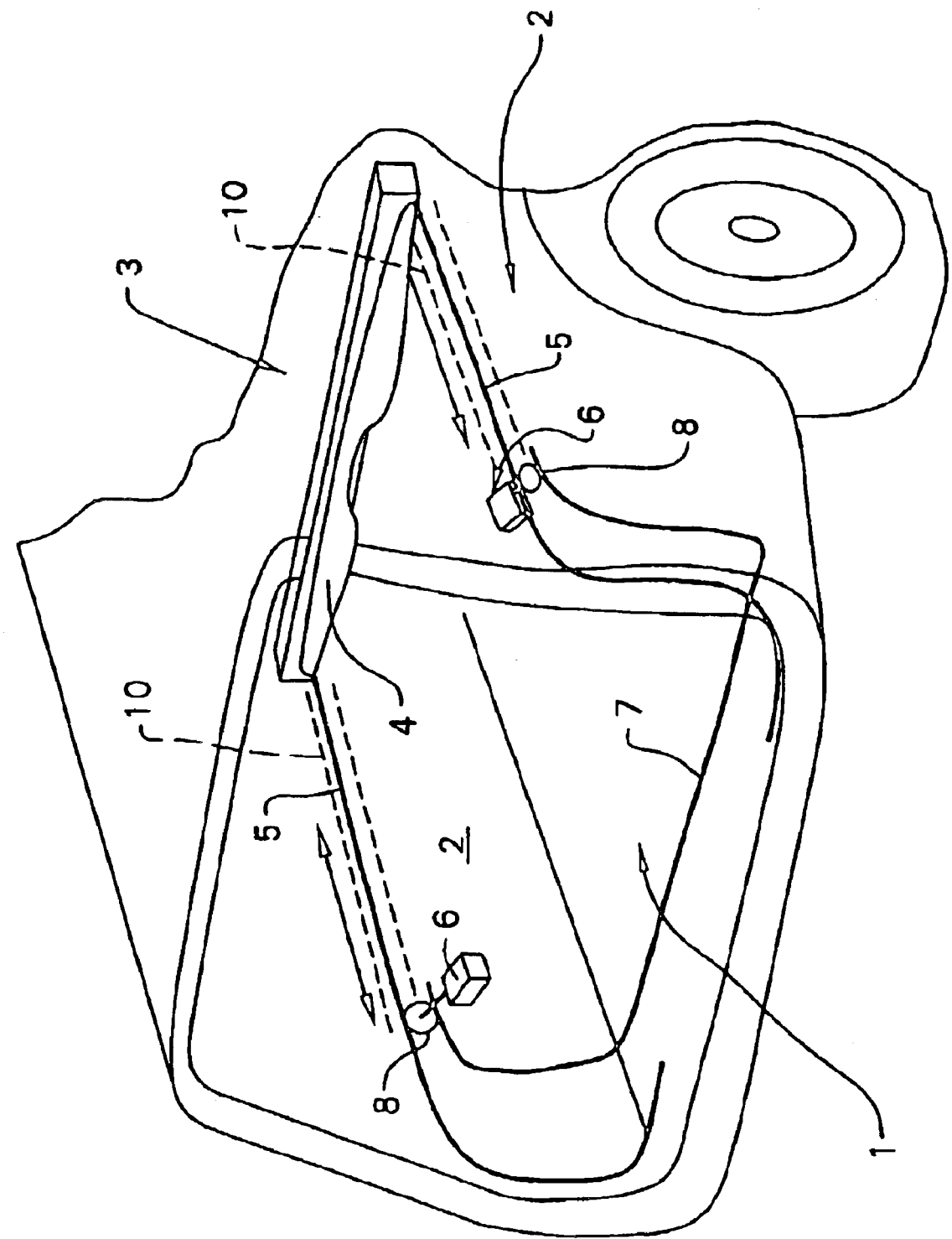

PROTECTIVE DEVICE FOR A MOTOR VEHICLE

FIELD OF THE INVENTION

The invention relates to a protective covering device for use inside a motor vehicle and comprising a flat sheet which is movably supported between a compactly rolled-up rest position and a pulled-out deployed position, which flat sheet is supported over its pull-out path in guideways in the sides of the vehicle, a drive system being associated with opposite sides of the flat sheet and synchronously driven through a synchronization structure.

BACKGROUND OF THE INVENTION

One such protective device is known in the form of a cargo-space cover from DE 198 25 353 C2. The known cargo-space cover has a web-like flat sheet which is movably arranged between a rest position and a pulled-out deployed position in the cargo space. A pull-out bar is provided at one front end of the web-like flat sheet, which pull-out bar is guided on opposing sides by a carrier. The carriers arranged on opposing vehicle sides are part of a drive strand and are each movable in the longitudinal direction of the cargo space by this drive strand. By moving the carriers, the pull-out bar is also moved, thus causing the flat sheet to be pulled out or wound up in a corresponding manner. An electric drive system is associated with each drive strand on each vehicle side. The two electric drive systems can be driven synchronously by means of an electronic speed governor, which guarantees that the carriers are guided in synchronism.

The purpose of the invention is to create a protective device of the above-mentioned type which enables through simple means a precise movement of the flat sheet.

SUMMARY OF THE INVENTION

This purpose is attained by two drive systems being connected through a mechanical synchronization gearing assembly. The inventive solution achieves an extremely simple and inexpensively designed, robust and operationally safe synchronization. By means of extremely few, nonelectric components, it is possible to achieve a synchronization of the drive systems utilizing components which are insensitive to high temperature and humidity fluctuations and similar situations.

The synchronization gearing assembly has in one embodiment of the invention an elongated transfer means coupled to the two drive systems. The elongated transfer means bridges the distance between the drive systems. In case the drive systems are integrated on opposite vehicle sides in respective side walls of a cargo space of a motor vehicle, the transfer means is guided preferably either under the floor area or over the roof area of the cargo space. The transfer means is designed flexibly in an advantageous manner in order to enable deviations of the power transfer.

A further embodiment of the invention provides as the transfer means a flexible push/pull means. As the push/pull means, which can transfer both pull and also push loads, a flexible rack, a Bowden cable or similar structure are preferably provided.

A further embodiment of the invention provides as the transfer means a flexible torque-transfer shaft coupled to drive shafts of the drive systems. A flexible threaded spindle is provided in particular as the flexible torque-transfer shaft, which threaded spindle is coupled to corresponding threaded worms in the area of the drive shafts of the drive systems.

Further advantages and characteristics of the invention will become apparent to those skilled in the art following a reading of the herein provided description of one preferred embodiment of the invention and with reference to the accompanying drawing.

BRIEF DESCRIPTION OF THE DRAWING

The single drawing illustrates schematically one embodiment of the inventive protective device for a cargo space of a motor vehicle.

DETAILED DESCRIPTION

In addition to protective devices serving as cargo-space covers, there is also known in the marketplace cargo-space separators and sun-protection systems for use in the area of motor-vehicle windows.

In a cargo space 1 of a motor vehicle, in the present case a station wagon, there is provided as a protective device a cargo-space cover 3 which is positioned directly behind a back-rest arrangement of a bench and extends between opposing side walls 2 of the cargo space 1. The cargo-space cover 3 has a cassette housing which is fixedly anchored to the vehicle in the area of the back-rest arrangement or in the area of the opposing side walls 2. A web-like flat sheet, which can be rolled up, is supported in the cassette housing. The flat sheet is, for this purpose, fastened on a roller shaft which is rotatably supported in the cassette housing. A restoring spring acts in a basically known manner onto the roller shaft, which restoring spring loads, as a drive system in the form of a spring store, the flat sheet in a winding-up direction. A dimensionally stable pull-out part 4 is arranged on the front end of the flat sheet, which pull-out part is designed mainly as a contoured part. The pull-out part 4 has coupled thereto in the area of the opposing vehicle sides pull strands 5 which are guided in suitable guide elements having guideways 10 provided in the side walls of the cargo space 1. The guide elements 10 for each strand 5 have a drive system 6 that is one of an electric, pneumatic, hydraulic or mechanical drive system. Preferably the drive system 6 is the electric drive system having an electric motor. The pull-out part 4 is moved in response to a movement of the two drive strands 5, namely in a pull-out plane toward and away from the cassette housing.

In order to achieve at any time a synchronism of both drive systems 6, a mechanical synchronization gearing assembly, in the present case in the form of a flexible push/pull means, namely in the form of a flexible rack 7, is provided. The rack 7 is installed by means of guideways not illustrated in detail in the side walls 2 of the cargo space 1 and below a floor of the cargo space. Also, the two drive strands 5 each have a synchronous-belt or rack drive feature thereon. In order to transfer suitable rotation motion in the same direction from the electric drive motors of the drive systems 6 onto the drive strands 5, a drive pinion 8 is mounted onto each drive shaft of each drive system 6. The drive pinions 8 each mate with a corresponding section of the rack 7 and the rack on each strand 5. In addition, each drive pinion 8 of the two drive systems 6 mating with the rack 7 serves to synchronize the movements of the pinions 8 by automatically transferring and in the same ratio a corresponding movement to each drive strand 5. Besides the flexible rack 7 and corresponding guideways for the flexible rack 7, which guideways are installed inside of the vehicle, no further components are needed in order to achieve the desired mechanical synchronization of the two drive systems 6.

What is claimed is:

1. A protective device for a motor vehicle comprising a flat sheet which is movably supported between a compactly rolled-up rest position and a pulled-out deployed position, said flat sheet being supported over its pull-out path in guideways in opposing sides of the vehicle, wherein two powered drive systems, each comprising a drive motor with a corresponding drive shaft, are associated with the flat sheet on the opposing sides of the vehicle, the powered drive systems being connected to one another through a mechanical synchronization gearing assembly comprising an elongated transfer device coupled to the drive shafts to be synchronously driven.

2. A protective device for a motor vehicle comprising a flat sheet which is movably supported between a compactly rolled-up rest position and a pulled-out deployed position, said flat sheet being supported over its pull-out path in guideways in opposing sides of the vehicle, wherein two powered drive systems having drive shafts are associated with the flat sheet on the opposing sides of the vehicle, the powered drive systems being connected to one another through a mechanical synchronization gearing assembly comprising a flexible push and pull device coupled to the drive shafts to be synchronously driven.

3. A protective device in a motor vehicle comprising:
   a flat sheet that is movably supported between a compact, rolled-up rest position and a pulled-out deployed position;
   a first guideway in a first side of the vehicle and a second guideway in a second opposing side of the vehicle, the first and second guideways for receiving and supporting said flat sheet along its pull-out path;
   a first strand in the first guideway on the first side of the vehicle secured to said flat sheet;
   a second strand in the second guideway on the second side of the vehicle secured to said flat sheet;
   a first driving system including a first drive motor on the first side of the vehicle for moving said first strand;
   a second driving system including a second drive motor on the second side of the vehicle for moving said second strand; and
   a mechanical synchronization assembly for ensuring that the first and second driving systems are synchronized.

4. A protective device in a motor vehicle comprising:
   a flat sheet that is movably supported between a compact, rolled-up rest position and a pulled-out deployed position;
   a first guideway in a first side of the vehicle and a second guideway in a second opposing side of the vehicle, the first and second guideways for receiving and supporting said flat sheet along its pull-out path;
   a first strand in the first guideway on the first side of the vehicle secured to said flat sheet;
   a second strand in the second guideway on the second side of the vehicle secured to said flat sheet;
   a first driving system on the first side of the vehicle for moving said first strand;
   a second driving system on the second side of the vehicle for moving said second strand; and
   a mechanical synchronization gearing assembly connected to said first driving system on the first side of the vehicle and connected to said second driving system on the second side of the vehicle for ensuring that the first and second driving systems are synchronized.

5. The protective device in a motor vehicle of claim 4, wherein said first driving system and said second driving system each comprise a drive motor having a drive shaft.

6. The protective device in a motor vehicle of claim 5, wherein each said drive shaft includes a drive pinion for moving the respective first or second pull strand.

7. The protective device in a motor vehicle of claim 6, wherein each said drive pinion mates with a corresponding part of said mechanical synchronization gearing assembly to ensure that the first and second driving systems are synchronized.

8. The protective device in a motor vehicle of claim 4, wherein said mechanical synchronization gearing assembly comprises a rack.

9. The protective device in a motor vehicle of claim 4, wherein said mechanical synchronization gearing assembly comprises a flexible push and pull device.

10. A protective device in a motor vehicle comprising:
    a flat sheet that is movably supported between a compact, rolled-up rest position and a pulled-out deployed position;
    a first driving system on a first side of the vehicle;
    a second driving system on a second side of the vehicle;
    a first pull strand on the first side of the vehicle secured to said flat sheet and controlled by said first driving system;
    a second pull strand on the second side of the vehicle secured to said flat sheet and controlled by said second driving system; and
    a mechanical synchronization gearing assembly connected to said first driving system on the first side of the vehicle and connected to said second driving system on the second side of the vehicle to ensure that the first and second driving systems are synchronized.

11. The protective device in a motor vehicle of claim 10, wherein said first driving system and said second driving system each comprise a drive motor.

12. The protective device in a motor vehicle of claim 11, wherein each said drive motor includes a drive shaft.

13. The protective device in a motor vehicle of claim claim 12, wherein each said drive shaft includes a drive pinion for moving the respective first or second pull strand.

14. The protective device in a motor vehicle of claim 10, wherein said first driving system and said second driving system each comprise a hydraulic system.

15. The protective device in a motor vehicle of claim 10, wherein said first driving system and said second driving system each comprise a pneumatic system.

16. The protective device in a motor vehicle of claim 10, wherein said first driving system and said second driving system each comprise a mechanical system.

* * * * *